United States Patent [19]

Boutelant

[11] 3,833,866

[45] Sept. 3, 1974

[54] MICROWAVE SWITCHING MATRIX

[75] Inventor: Paul Boutelant, Sceaux, France

[73] Assignee: International Standard Electric Corporation, New York, N.Y.

[22] Filed: July 20, 1973

[21] Appl. No.: 381,290

[30] Foreign Application Priority Data

Aug. 7, 1972 France..........................72.28414

[52] U.S. Cl. ........... 333/7 D, 333/84 M, 340/166 R

[51] Int. Cl............................ H01p 1/10, H04q 1/18

[58] Field of Search......... 333/7 R, 7 D; 340/166 R, 340/166 FE, 166 S, 166 SC; 317/101 CE, 112, ; 179/18 GE, 18 GF

[56] References Cited

UNITED STATES PATENTS

| | | | |
|---|---|---|---|
| 3,131,367 | 4/1964 | Pitts et al. | 333/7 D X |
| 3,480,885 | 11/1969 | Schrank | 333/7 |
| 3,568,105 | 3/1969 | Felsenheld | 333/7 D X |
| 3,611,016 | 10/1971 | Rogers et al. | 333/7 |
| 3,694,775 | 9/1972 | Rogers | 333/7 R |
| 3,711,834 | 1/1973 | Rogers | 340/166 R |

*Primary Examiner*—Paul L. Gensler
*Attorney, Agent, or Firm*—John T. O'Halloran; Menotti J. Lombardi, Jr.; Alfred C. Hill

[57] ABSTRACT

An $m \times n$ microwave switching matrix is disclosed including orthogonally related microwave transmission lines which may be interconnected by an appropriate number of microwave type switching diodes, such as PIN diodes. According to several disclosed embodiments a different power divider is coupled to each matrix input, each of said power dividers having $n$ outputs, and a different power combiner is coupled to each matrix output, each of said power combiners having $m$ inputs. The outputs of any given power divider are connected to one input of each power combiner by $n$ crosspoints including PIN diodes. Arrangements are also disclosed to equalize path lengths and impedances of the disclosed matrices.

16 Claims, 15 Drawing Figures

MICROWAVE SWITCHING MATRIX

BACKGROUND OF THE INVENTION

This invention relates to a switching matrix for very high frequency signals and more particularly to a switching matrix for microwave frequency signals.

Switching matrices with electronic crosspoints are well known in telephony. They usually consist of an arrangement of horizontal and vertical conductors and each horizontal conductor is connected to all of the vertical conductors which cross it by as many crosspoints. Each crosspoint includes an element which can be made either conducting (low resistance and the crosspoint is said to be "closed" in the case of an element in series) or non-conducting (high resistance and the crosspoint is said to be "open"). Diodes, bipolar transistors, PNPN diodes, MOS transistors etc . . . have been proposed for such elements. However, all these matrices and the corresponding crosspoints were intended for uses in which the frequency of the transmitted signals was well below 100 or so megahertz. Until now, therefore, switching was done, in the case of radio-links, on demodulated signals.

However, for some applications, especially in the case of multiple communications by means of a signal repeater, it can be very advantageous to be able to switch signals at intermediate frequencies which, in the case of satellite communications, may be located in the microwave frequency range.

SUMMARY OF THE INVENTION

An object of the present invention is to provide a switching matrix which can perform its switching operations in the microwave frequency range.

A feature of the present invention is the provision of a microwave switching matrix comprising: an arrangement of orthogonally related microwave transmission lines terminated in matched loads; an electrically switched crosspoint disposed at each intersection of the transmission lines; and a microwave isolator coupled to each input terminal and each output terminal of the arrangement.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
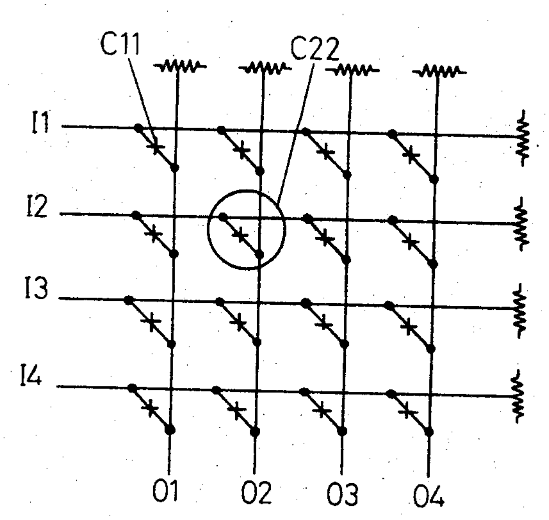
FIG. 1 is a schematic diagram of a first embodiment of a switching matrix in accordance with the principles of the present invention.

The microwave switching matrix according to this invention, as shown in FIG. 1, comprises a series of horizontal microwave transmission lines connected to the inputs I1 to I4 of the matrix and another series of vertical transmission lines connected to the outputs O1 to O4 of the matrix. Each line is terminated in a matched load.

At each intersection of a vertical line and a horizontal line there is a crosspoint, such as C11, connecting the corresponding matrix input and output (I1 and O1 for C11) when the crosspoint is closed. The switching matrix can thus connect any input to any output.

Figure 2:
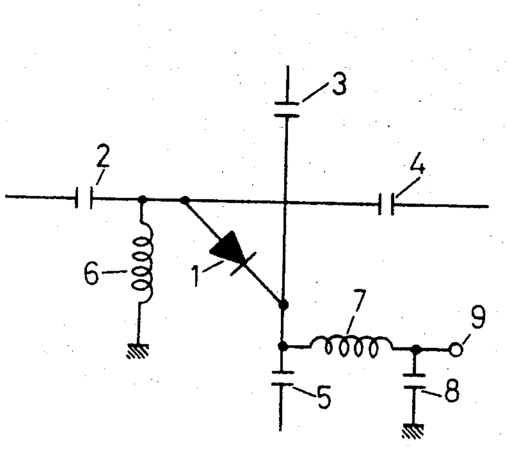
FIG. 2 is a schematic diagram of a diode type crosspoint with four ports.

FIG. 2 illustrates the electrical circuit diagram of a crosspoint such as point C22 which is circled in FIG. 1. This crosspoint uses a microwave switching diode 1, for example a PIN diode, which is particularly well adapted for thus use. This crosspoint is separated from the rest of the matrix by four capacitors 2, 3, 4 and 5 located at its four ports. Switching is controlled by applying a diode bias signal to the control input 9, making the diode conduct or not. This bias signal is transmitted through a choke coil 7 preventing the transmission of the microwave signal to the control circuit. Control input 9 is also shunted by a by-pass capacitor 8 to ground. The bias circuit is completed by means of the inductor 6 connected between the other terminal of diode 1 and ground. Inductor 6 and capacitor 2 form a high-pass filter allowing the microwave signal to be switched to pass therethrough. To further increase the isolation due to the open crosspoint, diode 1 may be replaced by two diodes in series. Also, two diodes in series and one in parallel can be used.

Figure 3:
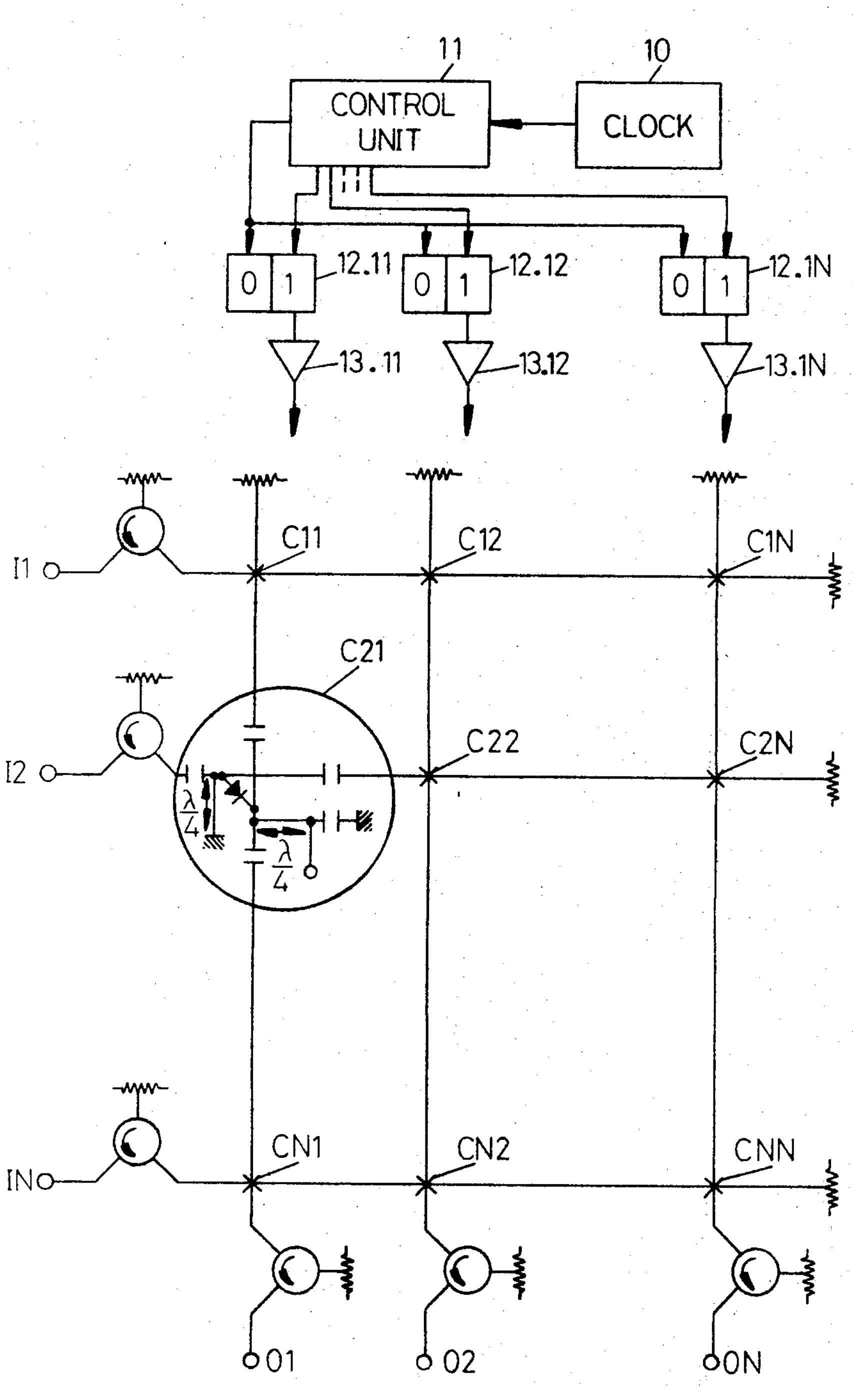
FIG. 3 is a schematic diagram of a second embodiment of a switching matrix in accordance with the principles of the present invention.

FIG. 3 shows a more detailed diagram of a switching matrix in accordance with the principles of the present invention with crosspoints having four ports. The circled crosspoint C21 is shown in more detail. Quarter wavelength transmission lines are used as inductors.

To reduce standing waves in the matrix (due especially to open crosspoint reflections), an isolator including here of a circulator with one port terminated across a matched load is placed immediately after each input connector and immediately before each output connector of the matrix. Also shown is a partial diagram of the crosspoint control circuits. Only the control circuits of crosspoints C11 and C1N are shown, since the other ones are exactly identical. A clock 10 supplies clock pulses to a control unit 11 including, for example, a storage unit in which the addresses of the crosspoints to be closed at each instant are stored. At each switching time, unit 11 supplies first a signal to clear flip flops 12.11 to 12.1N and then, depending on the address of the crosspoint to be closed, a binary bit 1 appears at the corresponding output which places the corresponding flip flop in the state 1. The flip flop output signal, after amplification by a control amplifier 13.11 to 13.1N, is applied as a bias signal for the corresponding crosspoint diode which becomes conductive. The crosspoint then remains closed until the following switching time.

Figure 4:
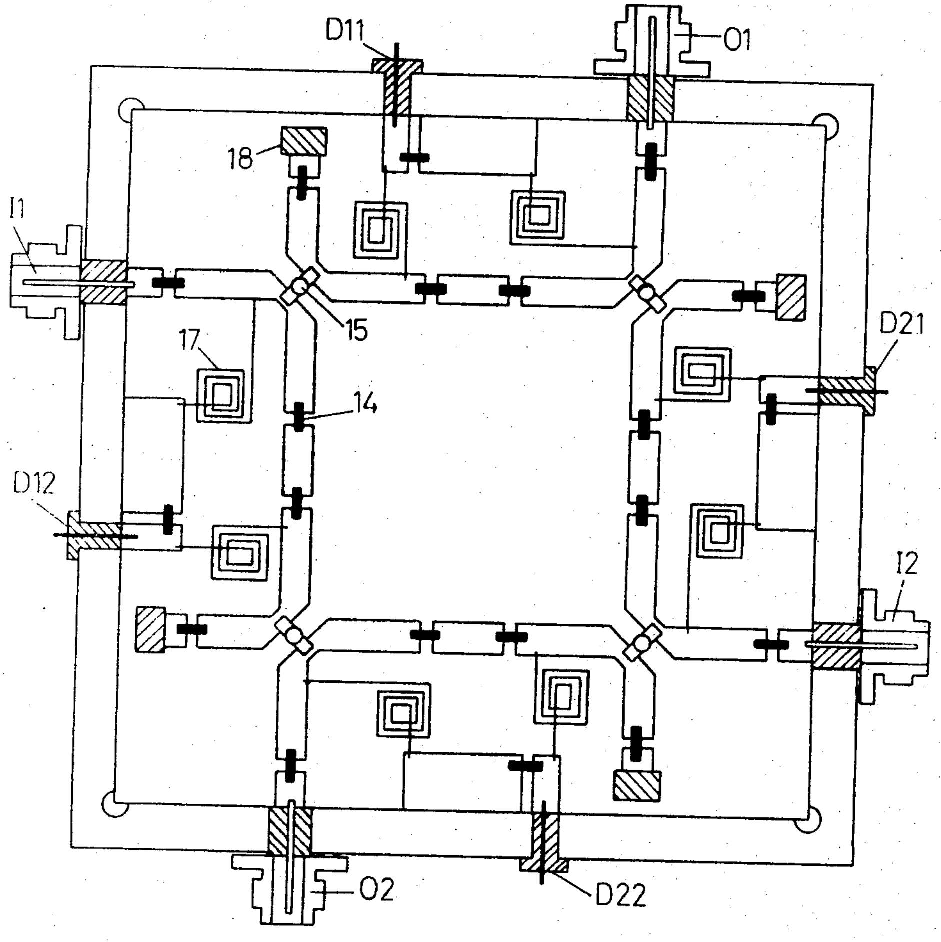
FIG. 4 is a schematic diagram of a microwave integrated circuit embodiment of a switching matrix in accordance with the principles of the present invention.

FIG. 4 illustrates a special embodiment of a microwave integrated circuit 2 × 2 matrix using microstrip lines. Each crosspoint, such as C11, is produced on a substrate having only one layer of microstrip, lines due to the fact that "folded" lines are used. In fact, the input and output lines at the crosspoint are folded by 90° to prevent them from crossing each other, and the diode 15, for example, is connected between the folding points of the two lines. Each crosspoint also includes the four separation capacitors, such as capacitor 14, the two inductors, such as inductor 17, a matched load 18, a coaxial connector, such as I1, and a control connector, such as D11 to D22. It is seen that by combining four exactly identical crosspoints, a 2 × 2 matrix is produced. This design has the advantage of avoiding the use of two layers of lines superposed to make an actual crossing, which would lead to lines having different characteristics impedances and to coupling between them. Nevertheless, to produce matrices of a higher order, several stages of such 2 × 2 matrices interconnected must be used.

Figure 5:
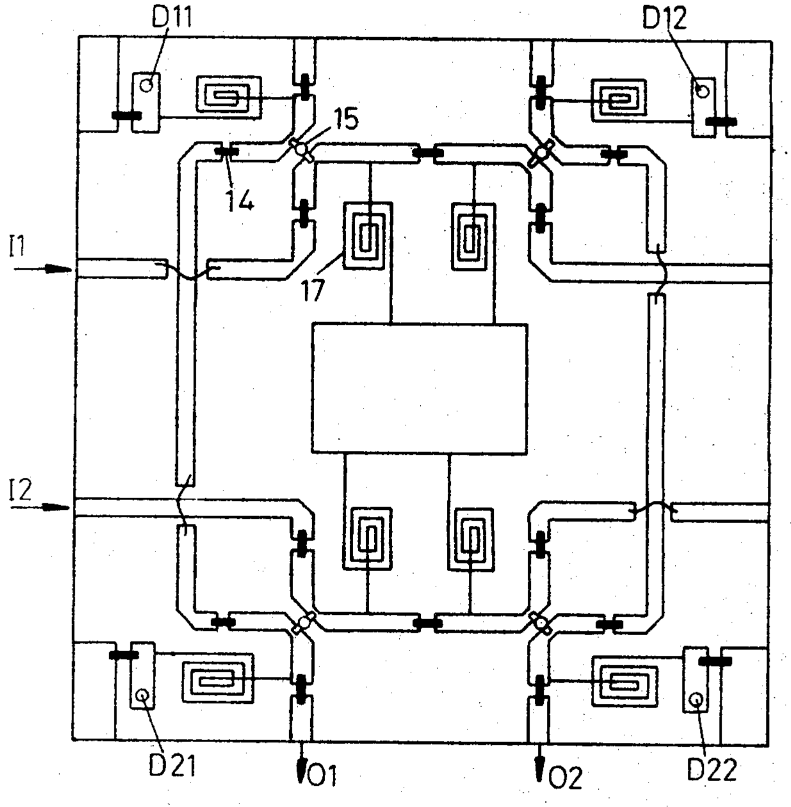
FIG. 5 is a schematic diagram of an alternative embodiment of the matrix in FIG. 4.

For a high order matrix therefore, it will usually be more practical to use the embodiment shown in FIG. 5. In this embodiment, the basic element is a 2 × 2 matrix produced on a single substrate. At each crosspoint, the two lines once folded are folded a second time by 90° and then cross each other by means of a wire bridge. Thus, the lines of the matrix are then again vertical and horizontal, and as many 2 × 2 matrices as required can be juxtaposed to form matrices of any order.

Figure 13:
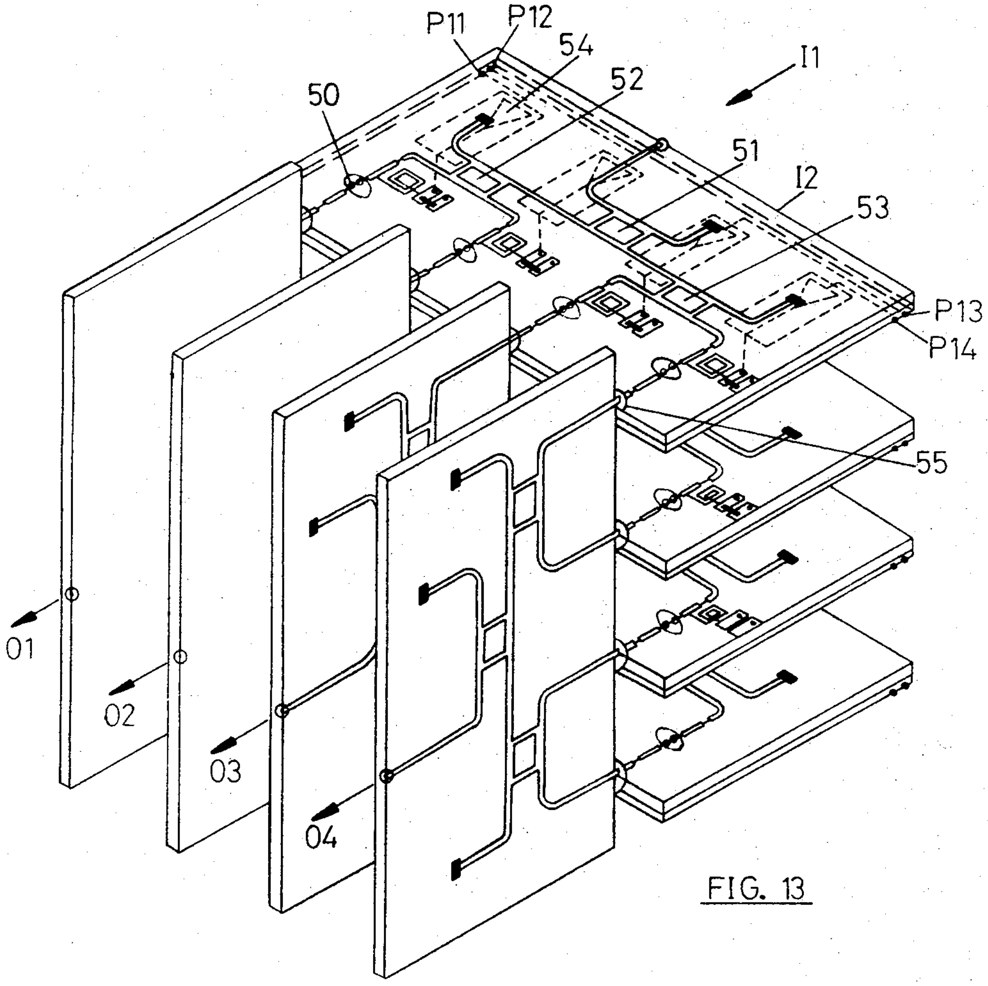
FIG. 13 is a schematic diagram of a mircowave integrated circuit embodiment of a two port crosspoint switching matrix in accordance with the principles of the present invention.

The control inputs D11 to D22 are brought through by drilling to the other side of the substrate to which another substrate holding a part of the control circuits may be attached to the metallization of the ground plane, as shown, for example, in FIG. 13.

Figure 6:
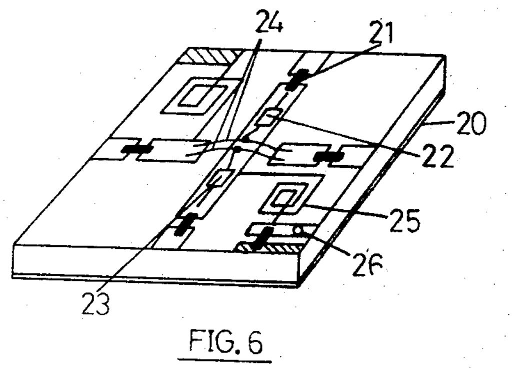
FIG. 6 is a schematic diagram of another embodiment of a crosspoint in accordance with the principles of the present invention.

FIG. 6 shows another crosspoint embodiment also obtained with a single layer of microstrip lines on a substrate having a ground conductor 20 on the other side. The lines cross by means of a wired bridge 24 and two PIN diodes 22 and 23 in parallel between the wires and the uninterrupted line are the switching elements of the crosspoint which also includes the two inductors, for example, inductor 25, the separation capacitors, such as capacitor 21 and the control input 26.

Figure 7:
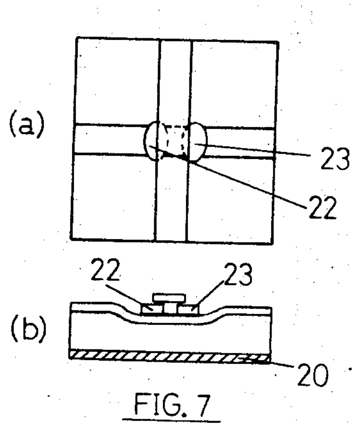
FIG. 7 is a schematic diagram of the embodiment of the crosspoint of FIG. 6 using superposed microstrip lines.

FIG. 7 shows the top view in (a) and a cross sectional view in (b) of a design variation in which the bridge is made by the use of the microstrip lines themselves. Identical reference numbers refer to the same elements as in FIG. 6.

Figure 8:
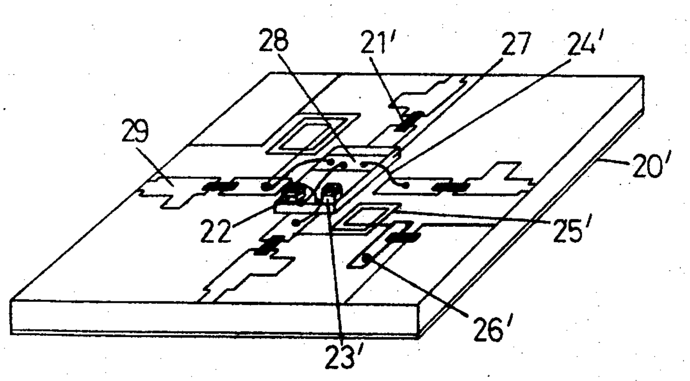
FIG. 8 is a schematic diagram of another embodiment of a crosspoint with four ports in accordance with the principles of the present invention.

FIG. 8 shows still another variation of a four port crosspoint. A first substrate with a ground conductor 20' holds the microstrip lines, one of which is interrupted, as well as elements 21', 25' etc. which are identical to elements 21, 25 etc . . . in FIG. 6. A second substrate 27 is placed on the uninterrupted line, at the crossing of the two lines, carrying a section of line 28 connected by wired bridges 24' to the ends of the interrupted line. The second substrate also holds the two diodes 22 and 23' in series. Each terminal includes an L-shaped matching device, such as device 29, matching the impedance of the crosspoint to the impedance of the microstrip lines (usually 50 ohms). The parallel stub has an impedance and length such that is resonates with the susceptance of the diodes.

Figure 9:
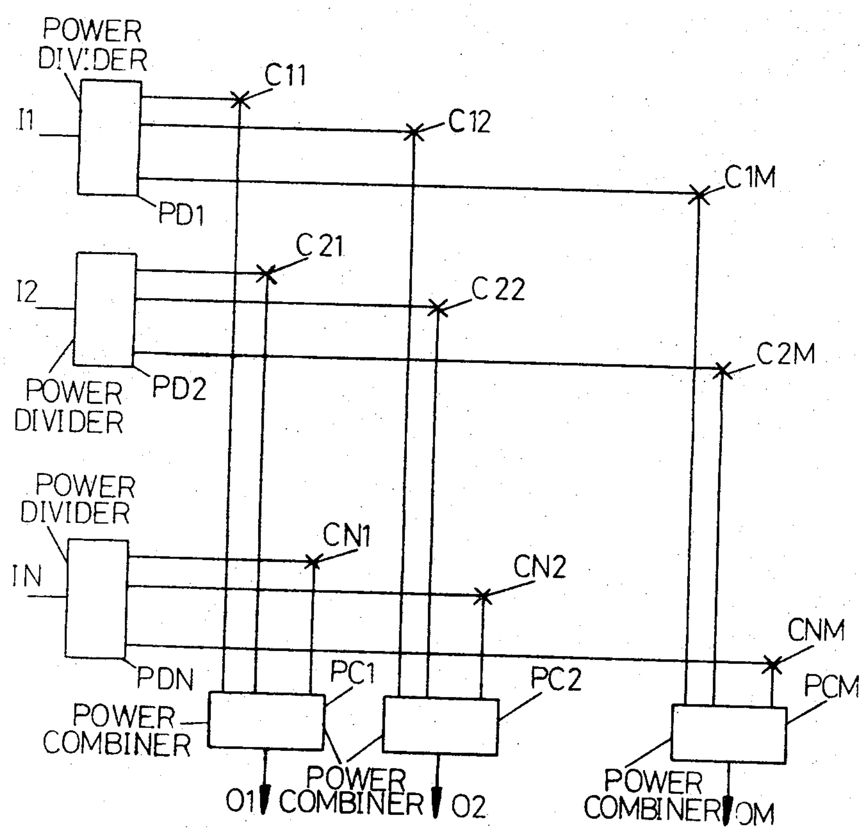
FIG. 9 is a schematic diagram of another embodiment of the switching matrix in accordance with the principles of the present invention.

FIG. 9 shows a variation of the microwave switching matrix according to the present invention. Each input I1 to IN is connected to a power divider PD1 to PDN having M outputs, if M is the number of matrix outputs, each divider distributing the input power equally between its M outputs.

At each matrix output O1 to OM, there is a power combiner PC1 to PCM having N inputs. Each output of a given divider, PD1 for example, is connected to the input of a different combiner PC1 to PCM by means of crosspoints, C11 to C1M and by means of microwave transmission lines.

The frequency dividers and combiners can be of any design known in the microwave technique and in particular can use 3 dB couplers. This matrix embodiment has an advantage in that the power dividers and combiners can serve as microwave isolators and offer very good decoupling between crosspoints. Moreover, it should be noted that each connection between an input and an output passes only one crosspoint. As can be observed, each crosspoint is a two port crosspoint.

Figure 10:
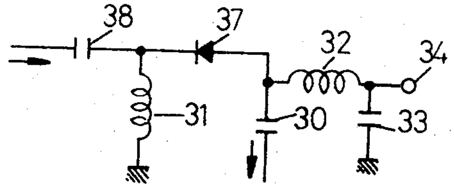
FIGS. 10 and 11 are schematic diagrams of two embodiments of a crosspoint with two ports in accordance with the principles of the present invention.
Figure 11:
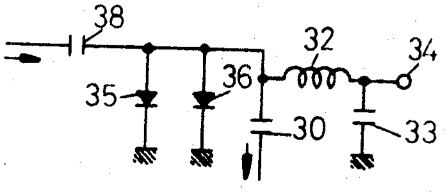

FIGS. 10 and 11 shows the electrical circuit diagrams of two embodiments of two port crosspoints with PIN diodes.

In FIG. 10, diode 37 is in series between input and output and is separated from the input and output by two capacitors 30 and 38. The bias circuit starting from the control input 34 is the same as in the example in FIG. 2 and includes a choke coil 32 and a by-pass capacitor 33 as well as parallel inductor 31. Of course, several diodes in series may be used.

In FIG. 11, diodes 35 and 36 are mounted in parallel between the transmission line and ground. In this embodiment, the parallel inductor has been eliminated. It is clear that one can also imagine combined circuits with diodes in series and in parallel.

Figure 12:
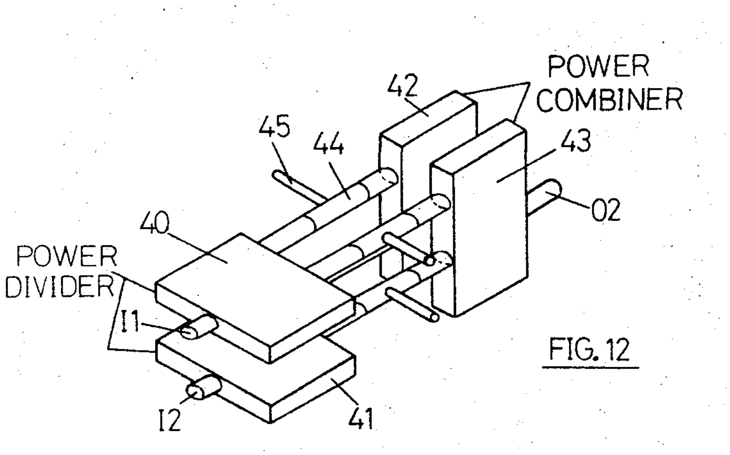
FIG. 12 is a schematic diagram of an embodiment of a switching matrix using coaxial lines in accordance with the principles of the present invention.

FIG. 12 shows the diagram of a 2 × 2 coaxial line matrix, with dividers 40 and 41, whose planes are parallel, mounted perpendicular to the power combiners 42 and 43. The diode or diodes are mounted in the coaxial line sections such as 44 and the control signal is brought in through a coaxial line 45.

Such an orthogonal layout has been employed in the microwave integrated circuit embodiment disclosed in FIG. 13. Each divider corresponding to one matrix input, I1 for example, is made of microstrip line on a substrate also containing the crosspoints corresponding to this divider. Such a divider includes the 3 dB couplers 51, 52 and 53 and each crosspoint includes two diodes 50 in parallel in a hole going through to the ground plane. A second layer holding the control amplifiers, such as amplifier 54, is glued to the ground plane. The control signals are applied to inputs P11 to P14 for the four crosspoints corresponding to input I1. Each power combiner corresponding to a matrix output, 01, to O4, is laid out on a substrate arranged perpendicular to the substrates holding the dividers. It is formed with 3 dB couplers and the vertical and horizontal substrates are connected by coaxial connectors, connector 55 for example. Of course, an isolator designed in the same technology can be added to each matrix input and output on the horizontal and vertical substrates respectively. Such an arrangement lends itself equally well to a design using waveguides.

In an effort to further improve the performance of the matrices according to this invention, it is possible to equalize the lengths of the electric path of the signals to be switched in the matrix, which can become very important for very high switching speeds.

Figure 14:
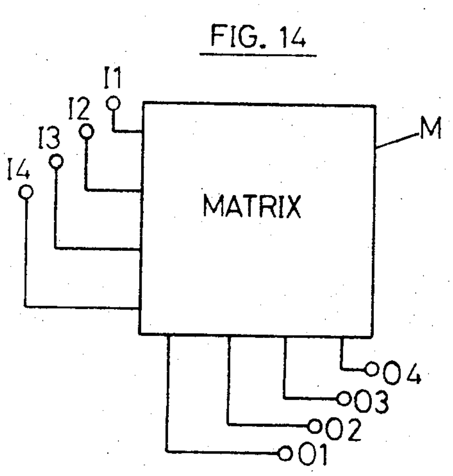
FIGS. 14 and 15 are diagrams of matrix path equalization devices in accordance with the principles of the present invention.

To do this, as shown in FIG. 14, there is inserted between the matrix M and the inputs I1 and I4 sections of lines of increasing length and between matrix M and the outputs O1 and O4 sections of lines of decreasing length. The line length thus added are calculated so that the total length of the path between any input and output is the same.

In the case of a matrix with four port crosspoints, it is also possible to equalize impedance conditions met by the signals along the various paths. In fact, from one path to another the number of open crosspoints encountered is different.

Figure 15:
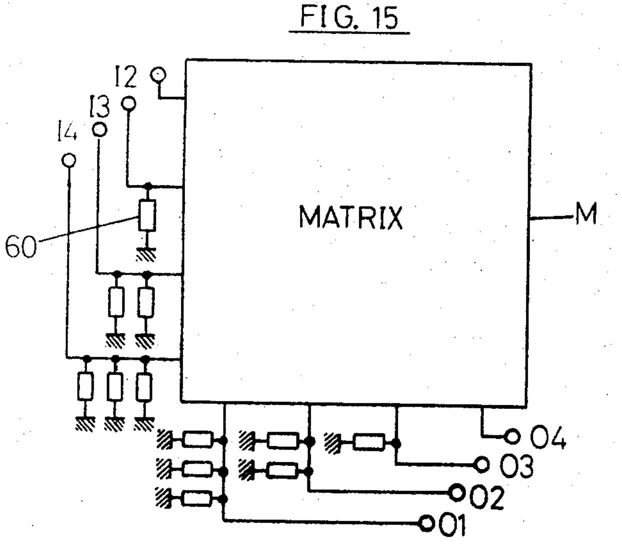

To do this, as shown in FIG. 15, there is connected in parallel to the added lines a number of impedances, for example, the impedance 60. The added impedance increase with the length of the line, with each impedance being equivalent to that of an open crosspoint. Thus, on any connection between input and output of the assembly, an equivalent number of open crosspoints will be encountered.

These impedances may consist either of passive components (resistors) or open diodes, or else transistors which have the advantage of practically zero consumption.

It is possible in all the cases described to obtain higher reliability by providing emergency paths in the matrix in case of failure of any crosspoint. For this, it is only necessary to add additional lines and columns with their crosspoints serving as emergency points, or to double each crosspoint with an emergency crosspoint through the use of couplers, or even to use two identical matrices in parallel using couplers, one of the matrices serving as an emergency matrix.

It should be noted that, in the description, the case of PIN diodes has been especially considered for the crosspoints but obviously other switching components can be used and in particular microwave transistors.

While I have described above the principles of my invention in connection with specific apparatus it is to be clearly understood that this description is made only by way of example and not as a limitation to the scope of my invention as set forth in the objects thereof and in the accompanying claims.

I claim:

1. A microwave switching matrix comprising:
an arrangement of orthogonally related microwave transmission lines terminated in matched loads;
an electrically switched crosspoint disposed at each intersection of said transmission lines; and
a microwave isolator coupled to each input terminal and each output terminal of said arrangement;
said arrangement including
$m$ input terminals, and
$n$ output terminals; said isolators including
$m$ power dividers, each of said dividers having $n$ outputs and an input connected to a different one of said input terminals, and
$n$ power combiners, each of said combiners having $m$ inputs and an output connected to a different one of said output terminals; and
said crosspoints number $m \times n$ interconnecting said n outputs of each of said dividers to a different one of said $m$ inputs of each of said combiners.

2. A matrix according to claim 1, wherein
each of said crosspoints includes
a first capacitor connected to the associated output of an associated one of said dividers,
a second capacitor connected to the associated input of an associated one of said combiners,
at least one microwave switching means connected in series between said first and second capacitors,
a first inductor coupled between ground and the junction of one terminal of said switching means and said first capacitor, said first inductor and said first capacitor providing high pass filter,
a control terminal,
a second inductor coupled in series between said control terminal and the other terminal of said switching means, and
a third capacitor coupled between said control terminal and ground.

3. A matrix according to claim 1, wherein
each of said crosspoints includes
a first capacitor connected to the associated output of an associated one of said dividers,
a second capacitor connected in series with said first capacitor and to the associated input of an associated one of said chambers,
at least one microwave switching means connected between ground and the junction of said first and second capacitors,
a control terminal,
an inductor coupled in series between said control terminal and the junction of said first and second capacitors, and
a third capacitor coupled between said control terminal and ground.

4. A matrix according to claim 1, further including
two orthogonally related sets of parallel substrates containing microwave integrated circuits, said substrates of one of said sets of substrates containing said dividers, said substrates of the other of said sets of substrates containing said power dividers, and said substrates of one of said one and said other of said sets of substrates containing said crosspoints.

5. A matrix according to claim 1, wherein
each of said isolators include
a microwave circulator having three ports with one of said ports terminated in a matched load.

6. A matrix according to claim 1, further including a first set of microwave transmission lines having increasing lengths connected to said input terminals, and a second set of microwave transmission lines having increasing lengths connected to said output terminals, said first and second sets of microwave transmission lines cooperating to equalize the electrical length of the signal path between any one of said input terminals and any one of said output terminals.

7. A matrix according to claim 6, further including an increasing number of impedances connected betwen said transmission lines of said first and second set of microwave transmission lines to equalize the impedance encountered by a microwave signal transmitted from any one of said input terminals to any one of said output terminals;

each of said impedances having an impedance equivalent to the impedance presented by one open crosspoint.

8. A matrix according to claim 1, wherein each of said input terminals is coupled to a different horizontal microwave transmission line of said arrangement; and each of said output terminals is coupled to a different vertical microwave transmission line of said arrangement.

9. A matrix according to claim 8, wherein each of said crosspoints includes a first pair of capacitors disposed in spaced relation in an associated one of said horizontal transmission lines, a second pair of capacitors disposed in spaced relation in an associated one of said vertical transmission lines, at least one microwave switching means connected between the junction of said first pair of capacitors and the junction of said second pair of capacitors, a first inductor coupled between ground and the junction of said first pair of capacitors, said first inductor and one capacitor of said first pair of capacitors providing a high pass filter, a control terminal, a second inductor coupled between said control terminal and the junction of said second pair of capacitors, and a capacitor coupled between said control terminal and ground.

10. A matrix according to claim 9, wherein each of said first and second inductors are provided by a quarter wavelength transmission line.

11. A matrix according to claim 9, wherein said horizontal and vertical transmission lines are microstrip lines carried by a common substrate, and each of said crosspoints include an associated one of said horizontal and vertical transmission lines folded 90° so as not to cross each other, and said switching means interconnecting said associated one of said horizontal and vertical transmission line at the 90° fold point.

12. A matrix according to claim 11, wherein said associated one of said horizontal and vertical transmission lines are folded a second time by 90° and cross each other by a wired bridge present in one of said associated one of said horizontal and vertical transmission lines.

13. A matrix according to claim 9, wherein each of said crosspoints include two orthogonally related microstrip transmission lines disposed of a common substrate, said two microstrip transmission lines crossing each other by a wired bridge.

14. A matrix according to claim 13, wherein said bridge includes two superimposed microstrip lines, and said microwave switching means is disposed between said superimposed microstrip lines.

15. A matrix according to claim 13, wherein said bridge includes a second substrate superimposed on one of said microstrip transmission lines of said common substrate, said other of said microstrip transmission lines of said common substrate being interrupted, a third microstrip transmission line disposed on said second substrate, a first pair of wires connected between said third microstrip transmission line and the adjacent ends of said other of said microstrip transmission lines of said common substrate, said microwave switching means formed on said second substrate, a third wire connected between said third microstrip transmission line and said microwave switching means, and a fourth wire connected between said microwave switching means and said one of said microstrip transmission lines of said common substrate.

16. A matrix according to claim 15, wherein each port of each of said crosspoints includes an L-shaped line-matching microstrip device having a stub, the length and impedance of said stub being selected to resonate with the susceptance of said microwave switching means.

* * * * *